(12) United States Patent
Pertusi

(10) Patent No.: US 6,216,812 B1
(45) Date of Patent: Apr. 17, 2001

(54) FRONT AXLE ASSEMBLY FOR A TRACTOR

(75) Inventor: Pierluigi Pertusi, Modena (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/452,137

(22) Filed: Dec. 1, 1999

(51) Int. Cl.$^7$ .................................................. B60K 17/00
(52) U.S. Cl. ............................................ 180/339; 180/337
(58) Field of Search ................................ 180/337, 339, 180/344, 378; 74/607

(56) References Cited

U.S. PATENT DOCUMENTS

| | | | |
|---|---|---|---|
| 4,086,826 | * 5/1978 | von Kaler | 74/713 |
| 4,422,516 | * 12/1983 | Yamaura | 180/339 |
| 4,677,871 | * 7/1987 | Taniyama et al. | 74/467 |

* cited by examiner

Primary Examiner—Paul N. Dickson
Assistant Examiner—Faye M. Fleming
(74) Attorney, Agent, or Firm—Larry W. Miller; John William Stader; John B. Mitchell

(57) ABSTRACT

A front axle assembly for a tractor or similar motor vehicle is provided with a front axle and a connecting unit interposed between the front axle and the frame of the tractor. The front axle assembly has an axle casing closed by oil-tight closing device supporting a gear for receiving motion from a propeller shaft forming part of the connecting unit.

11 Claims, 3 Drawing Sheets

FRONT AXLE ASSEMBLY FOR A TRACTOR

BACKGROUND OF THE INVENTION

The present invention relates to a front axle assembly for a tractor or similar motor vehicle.

Though specific reference is made herein to a tractor, it is firmly understood that the following description also applies to any other motor vehicle which may be provided with a front axle assembly of the type dealt with in the present invention.

Axle assemblies are commonly known components in tractor manufacturing. Substantially, they comprise a front axle, and a connecting unit interposed between the front axle and the tractor frame. The connecting unit may be fitted to the frame at one end by means of a spherical joint, and at the other end by means of a suspension device located close to the front axle. One type of suspension device commonly used in the tractor industry is a PANHARD system.

Currently marketed axle assemblies, however, have several drawbacks. Foremost of these is the fact that they are normally supplied to the tractor manufacturing facility fully assembled, i.e. with the front axle unitary fitted to the connecting unit forming an extremely bulky, substantially T-shaped structure. This makes transport of the axle assembly as a whole difficult, especially on account of the length of the connecting unit between the front axle and the frame.

An inventive solution has therefore been devised to disconnect the front axle structurally from the connecting unit, to enable the front axle and the connecting unit to be manufactured separately, even at two remote manufacturing plants, and assembled later.

Moreover, the front axle and the connecting unit have different lubricating systems: whereas the front axle requires oil lubrication considering that it houses a differential and axle shafts, the connecting unit simply needs the normal greasing of the two universal joints of the propeller shaft, of the spherical joint on the suspension arm, and of the suspension device (eventually of the Panhard type). The axle assembly according to the present invention therefore enables separate manufacture, even at two remote manufacturing plants, of a perfectly oil-tight, oil-lubricated front axle, and a connecting unit which is greased after assembly. Moreover, the novel closing device for closing the axle casing to define the front axle not only ensures a perfect sealing of the front axle, but also enables an easy and effective connection to the front axle of one end of the propeller shaft and one end of the suspension arm.

SUMMARY OF THE INVENTION

It is therefore an object of the present invention to overcome the prior art drawbacks by providing an axle assembly having considerable advantages in terms of production by enabling the two basic substructures of the axle assembly—the front axle and connecting unit—to be manufactured separately.

According to the present invention, there is provided a front axle assembly for a tractor or similar motor vehicle, comprising a front axle and a connecting unit interposed between the front axle and the frame of the tractor; the front axle assembly being characterized in that the front axle in turn comprises an axle casing closed by oil-tight closing means supporting a gear for receiving motion from a propeller shaft forming part of the connecting unit.

It is an advantage of this invention that the manufacturing of the front axle and connecting unit can be accomplished at two different locations, followed by assembly.

It is another advantage of this invention that the front axle can be manufactured as an oil lubricated part and the connecting unit can be manufactured as a grease-lubricated part.

It is still another advantage of this invention that the assembly and disassembly of connecting unit and front axle can be accomplished through the use of fasteners, such as screws, to provide a trouble-free operation.

It is yet another advantage of this invention that the suspension device can be located between the axle casing and the joint.

These and other objects, features and advantages are accomplished according to the instant invention in which a front axle assembly for a tractor or similar motor vehicle is provided with a front axle and a connecting unit interposed between the front axle and the frame of the tractor. The front axle assembly has an axle casing closed by oil-tight closing device supporting a gear for receiving motion from a propeller shaft forming part of the connecting unit.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
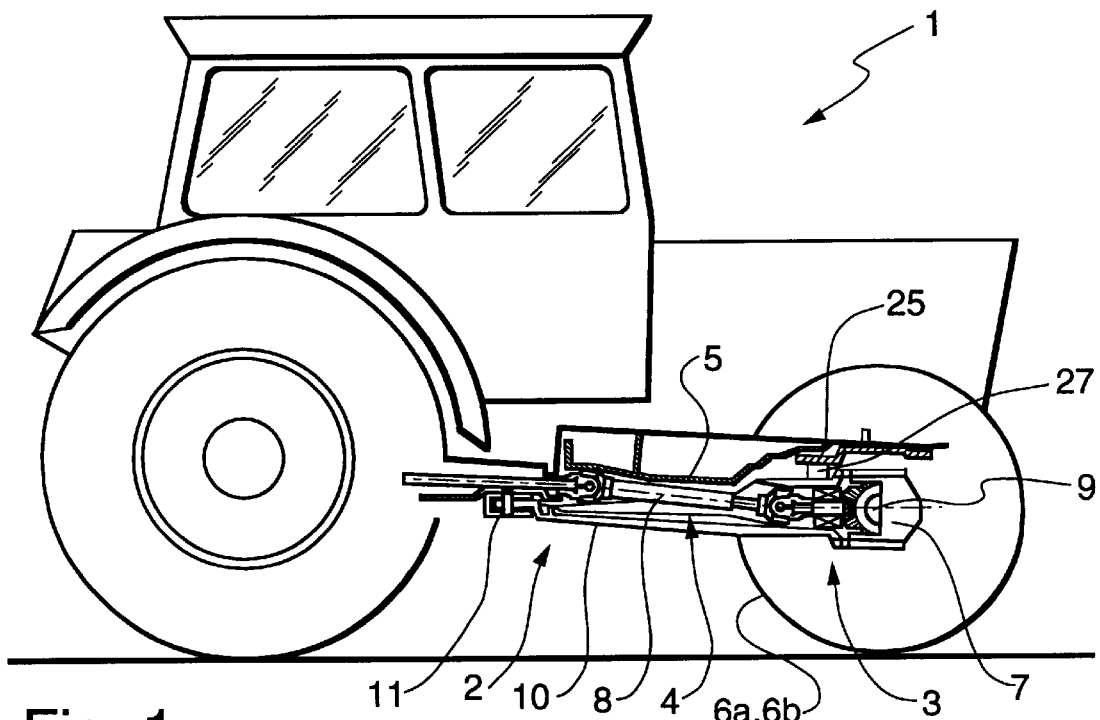
FIG. 1 shows a longitudinal section of a tractor featuring a front axle assembly in accordance with the present invention.
Figure 2:
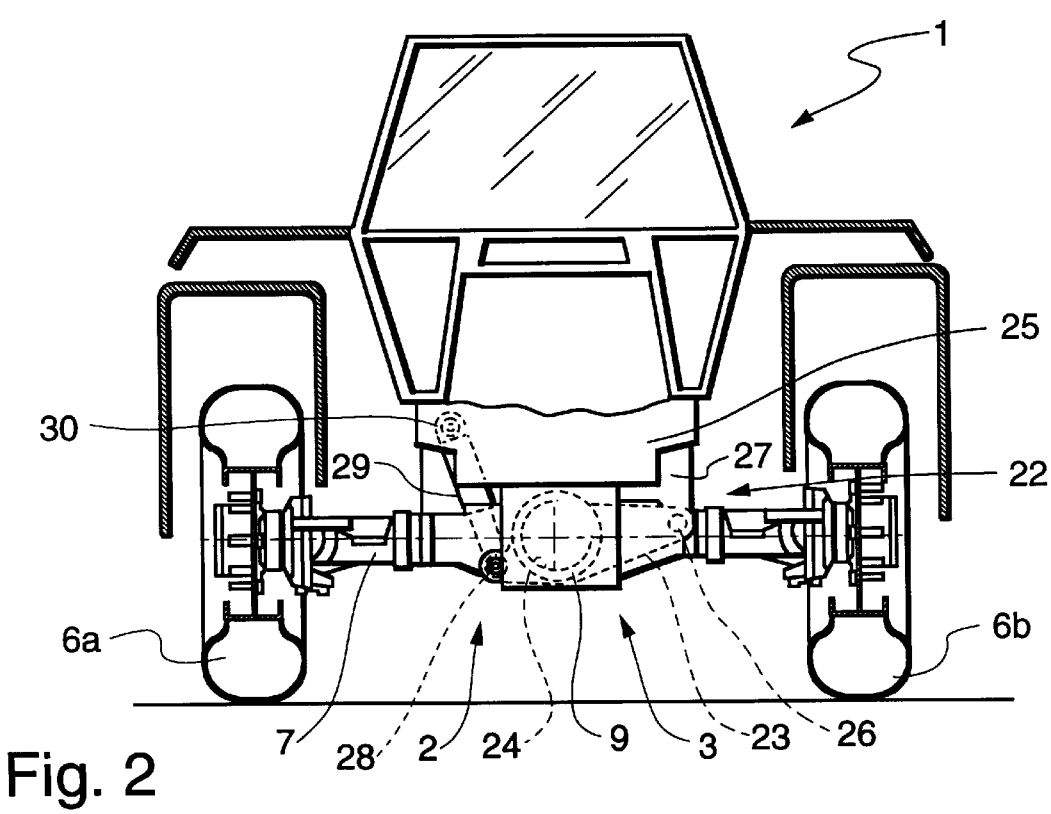
FIG. 2 shows a cross section of the FIG. 1 tractor illustrating in particular the suspension members of the connecting unit and the front axle.

Referring now to FIGS. 1 and 2, a tractor 1 incorporating the principles of the instant invention, including an axle assembly 2, can best be seen. In the following description, only the particulars of tractor 1 essential to a clear understanding of the present invention will be described in detail, the remaining aspects of the tractor being conventional and well known to one of ordinary skill in the art.

With reference to FIGS. 1 to 5 as a whole, axle assembly 2 substantially comprises a front axle 3 extending crosswise with respect to a connecting unit 4. The unit 4 is located rearwardly of the axle 3 and extends lengthwise of tractor 1 between the frame 5 of the tractor 1 and the front axle 3.

Front axle 3 supports in a known manner two front wheels 6a, 6b, and houses axle shafts 7 driven by a propeller shaft 8 via a differential 9. More specifically, front axle 3 can easily be divided into an axle casing 13, which in a way represents the main housing of axle shafts 7 and the differential 9, and an oil-tight closing device 14 closing axle casing 13 by means of conventional fastening means (not shown).

Connecting unit 4 on the other hand comprises a suspension arm 10 for supporting front axle 3, which would otherwise rotate under the weight of frame 5. Suspension arm 10 is connected to the frame 5 by an articulated joint 11 described in detail hereafter with reference to FIGS. 3 and 5. The connecting unit 4 further comprises a propeller shaft 8, which is provided at one end with a universal joint 12.

Figure 3:
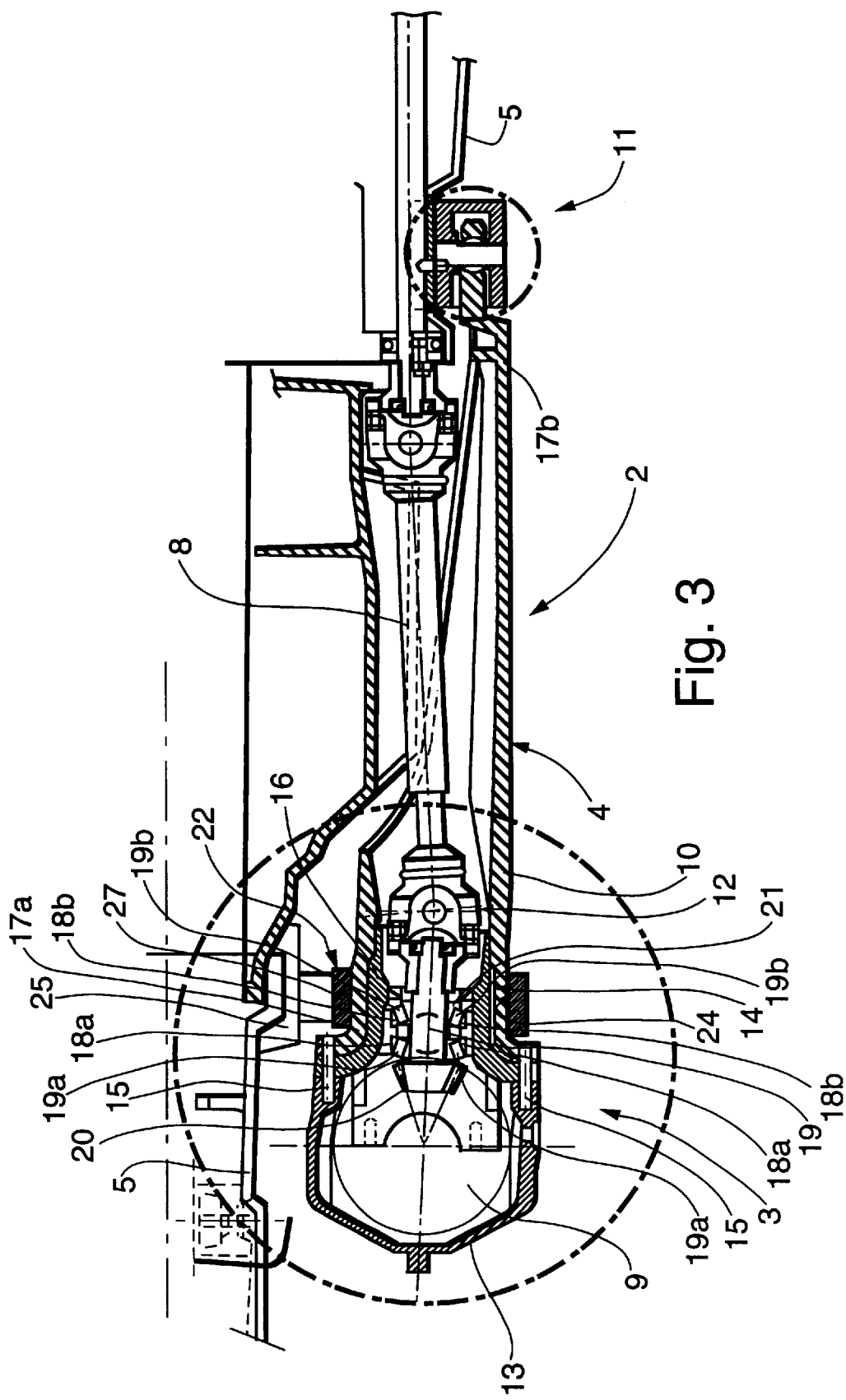
FIG. 3 shows a longitudinal section of the front axle assembly according to the present invention.
Figure 4:
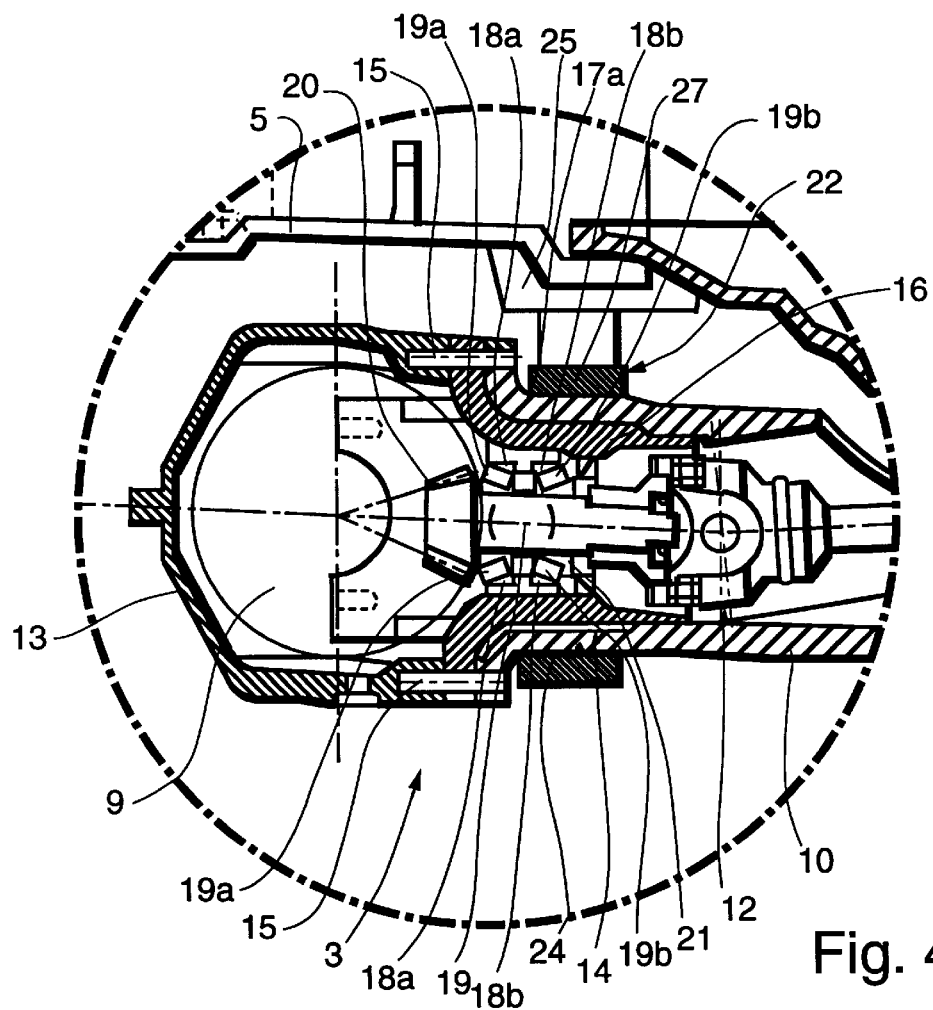
FIG. 4 shows an enlarged first detail of the FIG. 3 front axle assembly.

Closing device 14 of front axle 3 plays a decisive role in the present invention. The closing device, in fact, may be pre-fitted to axle casing 13 to define a lubricated, oil-tight front axle 3, which is easily connectable, by means of four screws 15 (of which only two are shown in FIGS. 3 and 4), to suspension arm 10 which, together with the other components of connecting unit 4, defines the portion of axle assembly 2 not requiring oil lubrication.

The main advantage of such a solution lies in the possibility of manufacturing front axle 3—which, as stated, defines the oil-lubricated portion of axle assembly 2—at a different plant from that producing connecting unit 4.

In other words, closing device 14 defines a sort of cover for axle casing 13, so that casing 13 may be filled with lubricating oil and transported safely, with basically no leakage, to the assembly plant for assembly to connecting unit 4.

Closing device 14 (FIG. 4) in turn comprises a sleeve 16 connectable to casing 13 by known means, such as bolts (not shown). These bolts have countersunk heads so as not to interfere with a mating surface of a first end 17a of the suspension arm 10. The outer shape of the sleeve 16 substantially reproduces the inner shape of said first end 17a of the suspension arm 10 and basically consists of a cylindrical portion running out in an outwardly turned flange. Part of the cylindrical portion of the sleeve 16 represents a close fit with an internal cylindrical portion of said first end 17a of the suspension arm 10. The outer surface of sleeve 16 may therefore be fitted easily to the inner surface of first end 17a of arm 10. This first end 17a, as stated, is connected to front axle 3 by means of four screws 15, which run through four appropriate holes in sleeve 16, these holes being offset from the bolts for connecting sleeve 16 to casing 13.

The cylindrical portion of sleeve 16 comprises two inner seats 18a, 18b for housing respective roller bearings 19a, 19b supporting a shaft 19, which acts as a connecting member between universal joint 12 and differential 9. Motion is actually transmitted between propeller shaft 8 and differential 9 by means of a pinion 20 which meshes with the gears of differential 9 and is fitted to shaft 19 at the end opposite the end facing universal joint 12. Shaft 19 and propeller shaft 8 are connected by known systems at universal joint 12.

A seal 21, made of plastic material and fitted to shaft 19 at the end opposite pinion 20, is operable to seal casing 13 and prevent leakage of lubricating oil from axle casing 13.

Connecting unit 4 and closing device 14 are supported in known manner by a Panhard suspension device 22 suspended from frame 5 of tractor 1. As shown in FIG. 2, suspension device 22 is defined by a supporting member 23, which comprises a seat 24 for first end 17a of arm 10 and is suspended from a main body member 25 connected by known means (not shown) to frame 5. More specifically, supporting member 23 is connected at one end, by means of an articulated joint 26, to a lug member 27 integral with main body member 25, and at the other end, by means of an articulated joint 28, to one end of a hydraulic shock-absorbing cylinder 29, the other end of which is connected by an articulated joint 30 to main body member 25.

As shown in FIGS. 1 and 3, suspension device 22 is located between front axle 3 and spherical joint 11, which provides a second connection of arm 10 to frame 5. In other words, arm 10 and, consequently, front axle 3 are suspended from frame 5 by means of suspension device 22 at one end and spherical joint 11 at the other.

Figure 5:
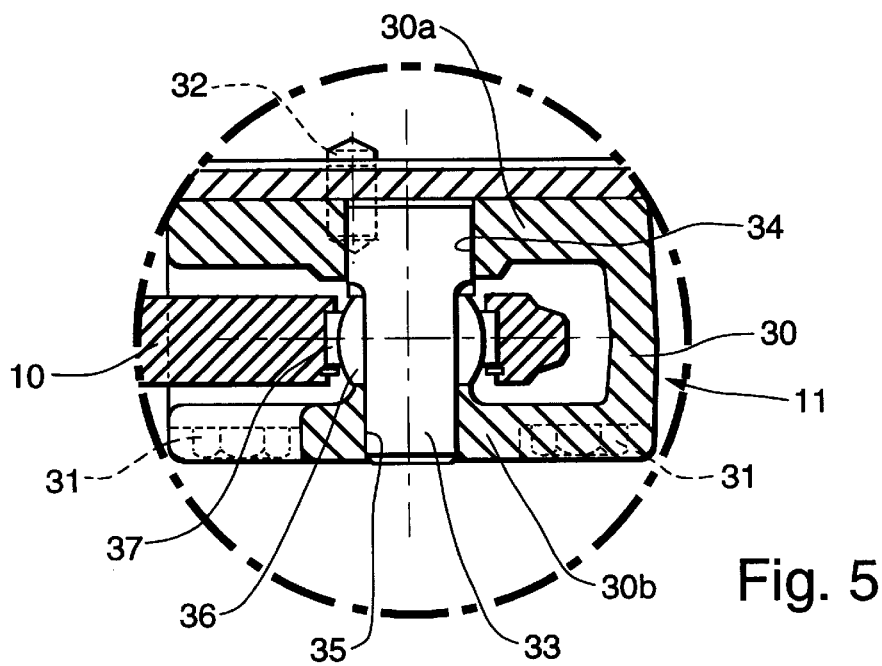
FIG. 5 shows an enlarged second detail of the FIG. 3 front axle assembly.

With particular reference to FIGS. 3 and 5, spherical joint 11 comprises a box body 30 connected to frame 5 by four screws 31 and two locating pins 32 (only one shown) which are provided for withstanding the shear stress from suspension arm 10. Spherical joint 11 also comprises a hinge pin 33 fitted to the box body by means of two adjacent seats 34, 35, each formed in a respective wall 30a, 30b of box body 30. To form a connection between the suspension arm 10 and the spherical joint 11, a ball 36, combined with a respective ball bearing 37 integral with arm 10, is interposed between pin 33 and a second end 17b of suspension arm 10. As a result, as best can be seen from FIG. 3, spherical joint 11 permits both pitching and rolling oscillations of front axle 3.

Front axle assembly 2 according to the present invention provides for excellent performance in terms of both stress distribution and power transmission.

In particular, the following advantages are accomplished according to the instant invention:

- manufacturing front axle 3 and connecting unit 4 at two different locations, followed by assembly;
- manufacturing an oil-lubricated first part (front axle 3) and a grease-lubricated second part (connecting unit 4);
- trouble-free assembly and disassembly of connecting unit 4 and front axle 3 by means of screws 15; and
- locating suspension device 22 between axle casing 13 and joint 11.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a frame and a front axle assembly including a front axle and a connecting unit interposed between said front axle and the frame of the tractor, the improvement comprising:

said front axle includes an axle casing closed by oil-tight closing means supporting a gear for receiving motion from a propeller shaft forming part of said connecting unit.

2. The tractor of claim 1 wherein said axle casing and said closing means are connected to each other by a releasable fastener device.

3. The tractor of claim 1 wherein said closing means includes a sleeve having an outer shape substantially corresponding to the inner shape of a first end of said connecting unit.

4. The tractor of claim 3 wherein said sleeve comprises a cylindrical portion which is captive in said first end of said connecting unit.

5. The tractor of claim 4 wherein said closing means includes a shaft connected at one end to said propeller shaft and at the other end to a differential housed in said axle casing.

6. The tractor of claim 5 wherein said shaft has a universal joint at a first end, and a pinion at a second end.

7. The tractor of claim 6 wherein a seal is provided for sealing said axle casing.

8. The tractor of claim 7 wherein said connecting unit is suspended from the frame of said tractor by a suspension device at one end and a spherical joint at the other end.

9. The tractor of claim 8 wherein said suspension device is located between said axle casing and said spherical joint.

10. The tractor of claim 9 wherein said spherical joint comprises a box body fitted to the frame; and a hinge pin supported by said box body and about which a second end of the connecting unit rotates spherically.

11. The tractor of claim 10 wherein said front axle is oil-lubricated, and said connecting unit is grease-lubricated.

* * * * *